(12) United States Patent
Henry et al.

(10) Patent No.: US 6,499,101 B1
(45) Date of Patent: Dec. 24, 2002

(54) STATIC BRANCH PREDICTION MECHANISM FOR CONDITIONAL BRANCH INSTRUCTIONS

(75) Inventors: G. Glenn Henry, Austin, TX (US); Terry Parks, Austin, TX (US)

(73) Assignee: I.P. First L.L.C., Fremont, CA (US)

( * ) Notice: Subject to any disclaimer, the term of this patent is extended or adjusted under 35 U.S.C. 154(b) by 0 days.

(21) Appl. No.: 09/272,225

(22) Filed: Mar. 18, 1999

(51) Int. Cl.[7] .................................................. G06F 9/00
(52) U.S. Cl. ........................................ 712/239; 712/234
(58) Field of Search ................................ 712/239, 240, 712/234

(56) References Cited

U.S. PATENT DOCUMENTS

| | | | |
|---|---|---|---|
| 4,679,141 A | | 7/1987 | Pomerance et al. |
| 5,584,001 A | | 12/1996 | Hoyt et al. |
| 5,634,119 A | | 5/1997 | Emma et al. |
| 5,659,752 A | | 8/1997 | Heisch et al. |
| 5,687,360 A | * | 11/1997 | Chang ........................ 712/240 |
| 5,752,014 A | * | 5/1998 | Mallick ...................... 712/240 |
| 5,758,142 A | | 5/1998 | McFarling et al. |
| 5,758,143 A | * | 5/1998 | Levitan ....................... 712/240 |
| 5,764,970 A | | 6/1998 | Rana et al. |
| 5,815,699 A | * | 9/1998 | Puziol et al. ................... 712/1 |
| 5,828,374 A | | 10/1998 | Steely, Jr. et al. |
| 5,848,268 A | | 12/1998 | Matsuo |
| 5,864,697 A | * | 1/1999 | Shiell ......................... 712/240 |
| 5,928,358 A | * | 7/1999 | Takayama ................... 712/239 |
| 5,978,909 A | * | 11/1999 | Lempel ....................... 712/240 |
| 6,088,793 A | | 7/2000 | Liu et al. |
| 6,092,187 A | * | 7/2000 | Killian ........................ 712/239 |
| 6,112,293 A | | 8/2000 | Witt |
| 6,115,809 A | | 9/2000 | Mattson, Jr. et al. |
| 6,125,444 A | | 9/2000 | Check et al. |
| 6,151,672 A | * | 11/2000 | Hunt .......................... 712/239 |
| 6,205,545 B1 | * | 3/2001 | Shah .......................... 712/237 |
| 6,247,122 B1 | * | 6/2001 | Henry ........................ 712/239 |
| 6,263,427 B1 | | 7/2001 | Cummins et al. |
| 6,272,263 B1 | | 8/2001 | Talcott |
| 6,311,261 B1 | * | 10/2001 | Chamdani et al. ............ 712/23 |

OTHER PUBLICATIONS

Using Hybrid Predictors to Improve Branch Prediction Accuracy in the Presence of Context Swithes, Evers et al., ISCA 5/96.
Superscalar Micronprocessor Design, Mike Johnson, Prentice Hall 1991.

(List continued on next page.)

Primary Examiner—Eric Coleman
(74) Attorney, Agent, or Firm—Richard K. Huffman; James W. Huffman (57) ABSTRACT

An apparatus and method are provided for accurately predicting the outcome of branch instructions prior to their execution by a pipeline microprocessor. The apparatus includes a static branch predictor, a prediction correlator, and branch history update logic. If a branch instruction is known to exhibit a bias toward a particular outcome, then the static branch predictor directs the microprocessor, via a precedence signal, to take the particular outcome, regardless of what a dynamic branch prediction for the branch instruction may indicate. Thus, the predicted outcome takes precedence over the dynamic branch prediction for a biased outcome branch instruction. The branch history update logic updates a branch history entry corresponding to a branch instruction following its resolution, unless the precedence signal indicates that a particular outcome for the branch instruction was directed by the static branch predictor. In this case the corresponding branch history entry is not updated.

25 Claims, 6 Drawing Sheets

OTHER PUBLICATIONS

A System Level Perspective on Branch Architecture Performance, Calder et al 1995 IEEE.

Alternative Implementations of Hybrid Branch Predictors, Chang et al., 1995 IEEE.

The Bi–Mode Branch Predictor, Lee et al., 1997 IEEE.

Assigning Confidence to Conditional Predictions, Jacobsen et al., 1996 IEEE.

Gshare, Agrees' Aid Branch Prediction, Linley Gwennap, Nov. 17, 1997, Microprocessor Report.

Combining Branch Predictors, Scott McFarling, Jun. 1993, WRL–Technical Note TN–36.

The Agree Predictor; A Mechanism for Reducing Negative Branch History Interference, Eric Sprangle et al.

* cited by examiner

*Branch Predictions Resulting from Aliasing Phenomena* ← 300

| Time | Instruction | BHT Pred | Static Pred | Action | Rslvd Outcome | Effect | BHT Update |
|---|---|---|---|---|---|---|---|
| T1 | JC | NT | NT | NT | T | FLUSH | T |
| T2 | JO | MISS | NT | NT | NT | NONE | NT |
| T3 | JO | NT | NT | NT | NT | NONE | NT |
| T4 | JC | MISS | NT | NT | T | FLUSH | T |

*Empirical Branch Instruction Outcomes in Predominant Desktop Applications*

| Instruction | Percentage Taken (%) |
|---|---|
| JO | 0.00 |
| JNO | 100.00 |
| JC | 45.08 |
| JNC | 31.94 |
| JZ | 35.60 |
| JNZ | 47.99 |
| J(C\|Z) | 62.58 |
| JN(C\|Z) | 31.58 |
| JS | 30.90 |
| JNS | 86.15 |
| JP | 0.00 |
| JNP | 0.00 |
| J(S^O) | 33.91 |
| JN(S^O) | 59.34 |
| J(S^O)\|Z | 33.88 |
| JN(S^O)\|Z | 57.25 |
| JCXZ | 29.51 |

— biased outcome

— unbiased outcome

*Biased Outcome Branch Prediction*

600

| Time | Instruction | BHT Pred | Static Pred | Action | Rslvd Outcome | Effect | BHT Update |
|---|---|---|---|---|---|---|---|
| T1 | JC | NT | NT | NT | T | FLUSH | T |
| T2 | JO | MISS | NT | NT | NT | NONE | NONE |
| T3 | JO | MISS | NT | NT | NT | NONE | NONE |
| T4 | JC | T | NT | T | T | NONE | T | accurate BHT entry; not influenced by outcomes of JO instuction flush is not required

FIG. 7

STATIC BRANCH PREDICTION MECHANISM FOR CONDITIONAL BRANCH INSTRUCTIONS

CROSS-REFERENCE TO RELATED APPLICATIONS

This application is related to the following U.S. patent applications: Ser. No. 09/203844, now U.S. Pat. No. 6,189,091 entitled, METHOD AND APPARATUS FOR SPECULATIVELY UPDATING GLOBAL BRANCH HISTORY; Ser. No. 09/203900, now U.S. Pat. No. 6,231,261, entitled, METHOD AND APPARATUS FOR PERFORMING BRANCH PREDICTION USING BRANCH TEST TYPE; and Ser. No. 09/203884, now U.S. Pat. No. 6,247,122, entitled, METHOD AND APPARATUS FOR PERFORMING BRANCH PREDICTION COMBINING STATIC AND DYNAMIC BRANCH PREDICTORS; all of the aforementioned applications having the same assignee and having common inventors.

BACKGROUND OF THE INVENTION

1. Field of the Invention

This invention relates in general to the field of instruction execution in computers, and more particularly to an apparatus and method for predicting the outcome of branch instructions in a pipeline microprocessor.

2. Description of the Related Art

An application program for execution on a microprocessor consists of a structured series of macro instructions that are stored in sequential locations in memory. A current instruction pointer within the microprocessor points to the address of the instruction currently being executed and a next instruction pointer within the microprocessor points to the address of the next instruction for execution. During each clock cycle, the length of the current instruction is added to the contents of the current instruction pointer to form a pointer to a next sequential instruction in memory. The pointer to the next sequential instruction is provided to logic that updates the next instruction pointer. If the logic determines that the next sequential instruction is indeed required for execution, then the next instruction pointer is updated with the pointer to the next sequential instruction in memory. Thus, macro instructions are fetched from memory in sequence for execution by the microprocessor.

Obviously, because a microprocessor is designed to execute instructions from memory in the sequence that they are stored, it follows that a program configured to execute macro instructions sequentially from memory is one which will run efficiently on the microprocessor. For this reason, most application programs are designed to minimize the number of instances where macro instructions are executed out of sequence. These out-of-sequence instances are known as jumps, or branches.

A program branch presents a problem because most conventional microprocessors do not simply execute one instruction at a time. Rather, a present day microprocessor consists of a number of pipeline stages, each stage performing a specific function. Instructions, inputs, and results from one stage to the next are passed in synchronization with a pipeline clock. Hence, several instructions may be executing in different stages of the microprocessor pipeline within the same clock cycle. As a result, when logic within a given stage determines that a program branch is to occur, then previous stages of the pipeline, that is, stages that are executing instructions following in sequence, must be cast out to begin execution of sequential macro instructions beginning with the instruction directed by the branch, or the branch target instruction. This casting out of previous pipeline stages is known as flushing and refilling the pipeline.

A conditional branch is a branch that may or may not occur, depending upon an evaluation of some specified condition. And, this evaluation is typically performed in later stages of the microprocessor pipeline. To preclude wasting many clock cycles associated with flushing and refilling the pipeline, present day microprocessors also provide logic in an early pipeline stage that predicts whether a conditional branch will occur or not. If it is predicted that a conditional branch will occur, then only those instructions prior to the early pipeline stage must be flushed, including those in the instruction buffer. Even so, this is a drastic improvement; correctly predicted branches are executed in roughly two clock cycles. But an incorrect prediction takes many more cycles to execute than if no branch prediction mechanism had been provided in the first place. The accuracy of branch predictions in a pipeline processor therefore significantly impacts the processor's performance, for better or worse.

Yet, present day branch prediction techniques chiefly predict the outcome of a given conditional branch instruction in an application program based upon outcomes obtained when the conditional branch instruction was previously executed within the same instance of the application program. Historical branch prediction, or dynamic branch prediction, is effective because conditional branch instructions tend to exhibit repetitive outcome patterns when executed within an application program.

The historical outcome data is stored in a branch history table that is accessed using the address of a conditional branch instruction-a unique identifier for the instruction. A corresponding entry in the branch history table contains the historical outcome data associated with the conditional branch instruction. A dynamic prediction of the outcome of the conditional branch instruction is made based upon the contents of the corresponding entry in the branch history table.

Yet, because most present day microprocessors have address ranges on the order of gigabytes, it is not practical for a branch history table to be as large as the microprocessor's address range. Because of this, smaller branch history tables are provided, on the order of kilobytes, and only low order bits of a conditional branch instruction's address are used as an index into the table. But this presents another problem: because low order address bits are used to index the branch history table, two or more conditional branch instructions can index the same entry. This is known as aliasing. As such, the outcome of a more recently executed conditional branch instruction will replace the outcome of a formerly executed conditional branch instruction that is aliased to the same table entry. If the former conditional branch instruction is encountered again, its historical outcome information is unavailable to be used for a dynamic prediction.

Because dynamic predictions are sometimes not available, an alternative prediction is made for the outcome of a conditional branch instruction, usually based solely upon some static attribute of the instruction, such as the relative direction of a branch target instruction as compared to the address of the conditional branch instruction. This alternative prediction is called a static prediction because it is not based upon a changing execution environment within an application program. The static branch prediction is most often used as a fallback in lieu of a dynamic prediction. Hence, when a dynamic prediction is unavailable, the static prediction is used.

The present inventors have observed that the outcomes of some conditional branch instructions, when observed on pipeline microprocessor executing today's predominant desktop computer application programs, exhibit a bias toward one outcome or the other, totally as a function of static indicators such as the type of conditional test performed, regardless of historical outcome data associated with the instructions. These instructions are called biased outcome conditional branch instructions. And, it has also been observed that the entries in a branch history table associated with other conditional branch instructions that exhibit no such bias, are at times negatively impacted as a result of updates occurring from biased outcome instructions which are aliased to the same entries.

Thus, the accuracy of branch predictions is degraded on the whole in a microprocessor that allows the outcomes of biased conditional branch instructions to impact the historical outcome data for conditional branch instructions that do not exhibit a static bias.

Therefore, what is needed is an apparatus for predicting the outcomes of branch instructions that is more accurate than has heretofore been provided.

In addition, what is needed is a branch prediction mechanism in a microprocessor that favorably utilizes static indicators of a conditional branch instruction to predict its outcome.

Furthermore, what is needed is an apparatus in a microprocessor for predicting branches that eliminates the effects of outcomes of biased outcome conditional branch instructions on data regarding historical outcomes for unbiased outcome conditional branch instructions.

Moreover, what is needed is a method in a microprocessor for mandating that the microprocessor use a static branch prediction over a dynamic prediction and for precluding the outcome of a conditional branch instruction whose static prediction was mandated from influencing outcome data in a branch history table.

SUMMARY

To address the above-detailed deficiencies, it is an object of the present invention to provide a static branch prediction apparatus that provides accurate branch predictions for biased outcome conditional branch instructions and unbiased outcome conditional branch instructions Another object of the present invention is to provide a branch prediction mechanism in a microprocessor that uses static indicators of a conditional branch instruction to favorably predict its outcome.

In another aspect, it is a feature of the present invention to provide a static branch prediction mechanism for predicting branches in a microprocessor. The static branch prediction mechanism has a static branch predictor, a prediction correlator, and branch history table update logic. The static branch predictor receives branch instructions from an instruction buffer, identifies a biased outcome branch instruction, and provides a static branch prediction for the biased outcome branch instruction. The static branch prediction is based upon observed outcome data corresponding to the biased outcome branch instruction. The static branch predictor also generates a precedence signal to indicate that the static branch prediction takes precedence over a dynamic branch prediction provided by a corresponding branch history table entry. The prediction correlator is coupled to the static branch predictor and a branch history table. The prediction correlator receives the precedence signal and directs the microprocessor to execute a speculative branch in accordance with the static branch prediction or the dynamic branch prediction. The branch history table update logic is coupled to the static branch predictor and the precedence signal. The branch history table update logic updates branch history entries in the branch history table following resolution of the branch instructions, where branch history entries corresponding to resolved biased outcome branch instructions are not updated, and where the precedence signal directs the branch history table update logic to preclude update of the corresponding branch history table entry.

Another advantage of the present invention is that execution speed of an application program is improved because unnecessary pipeline flushes due to incorrect branch predictions are reduced.

A further object of the invention is to provide an apparatus in a microprocessor for predicting branches that eliminates the effects of outcomes of biased outcome conditional branch instructions on historical outcome data associated with unbiased outcome conditional branch instructions.

In a further aspect, it is a feature of the present invention to provide a branch prediction apparatus. The branch prediction apparatus includes a static branch predictor and a prediction correlator. The static branch predictor identifies a biased outcome branch instruction and provides a static branch prediction for the biased outcome branch instruction, where the static branch prediction is based upon observed outcome data corresponding to the biased outcome branch instruction rather than outcomes corresponding to previous executions of the biased outcome branch instruction. The static branch predictor has a static prediction output and a precedence output. The static prediction output indicates whether a first speculative branch to a first target address is to be taken or not taken. The precedence output indicates that the static branch prediction is to take precedence over a dynamic branch prediction, where the dynamic branch prediction is provided by a corresponding entry in a branch history table, and where the precedence output directs branch update logic to preclude update of the corresponding entry following resolution of the biased outcome branch instruction. The prediction correlator is coupled to the static branch predictor and a branch history table. The prediction correlator directs a next instruction pointer to indicate a next sequential instruction address, the first target address, or a second target address.

A further advantage of the present invention is that space in a branch history table is not required for entries pertaining to biased outcome conditional branch instructions.

Yet another object of the present invention is to provide is a method in a microprocessor for mandating that the microprocessor use a static branch prediction over a dynamic prediction and for precluding the outcome of a conditional branch instruction whose static prediction was mandated from influencing outcome data in a branch history table.

In yet another aspect, it is a feature of the present invention to provide a method for performing branch prediction in a microprocessor. The method includes identifying a biased outcome branch instruction; providing a biased static branch prediction for the biased outcome branch instruction, the biased static branch prediction being based upon observed outcome data associated with the branch instruction instead of being based upon outcomes corresponding to previous executions of the biased outcome branch instruction; generating a precedence output to indicate that the biased static branch prediction is to take precedence over a dynamic branch prediction for the biased outcome branch instruction; directing the microprocessor to fetch instructions in accordance with the biased static branch prediction in lieu of the dynamic branch prediction, where the dynamic branch prediction is provided by a corresponding entry in a branch history table; resolving the outcome of the biased outcome branch instruction; and detecting the precedence output and precluding update of the corresponding entry in the branch history table.

Yet another advantage of the present invention is that a method is provided to reduce the confusion created in a branch history table by intermixing outcome results of biased outcome conditional branch instructions with that of unbiased conditional branch instructions.

BRIEF DESCRIPTION OF THE DRAWINGS

These and other objects, features, and advantages of the present invention will become better understood with regard to the following description, and accompanying drawings where.

DETAILED DESCRIPTION

In light of the above background on techniques for predicting the outcome of a branch instruction in a pipeline microprocessor, several related art examples will now be discussed with reference to FIGS. 1 through 3. These examples illustrate the problematic nature of present day branch prediction techniques, in particular when these techniques are employed during the execution of application programs in a desktop computer. Following this discussion, a detailed description of the present invention will be provided with reference to FIGS. 4 through 7. Use of the present invention provides more accurate branch outcome predictions than those achieved via conventional techniques, thus allowing desktop computer applications to run faster than has previously been obtained.

Figure 1:
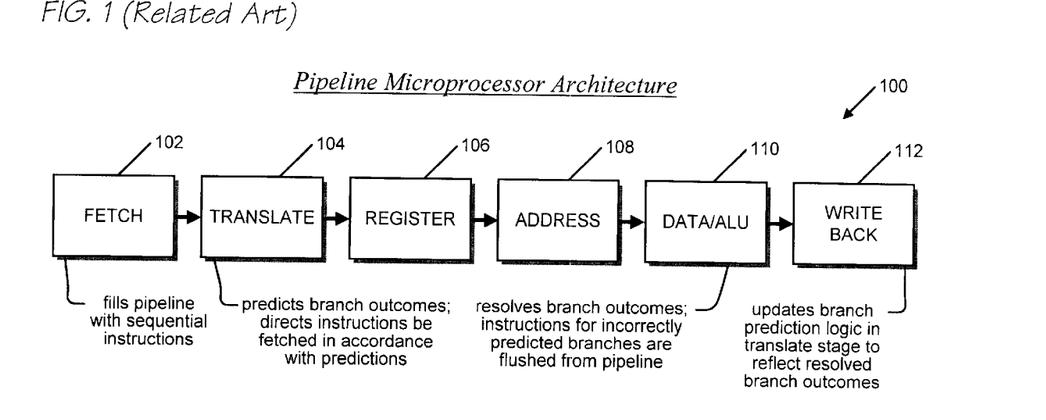
FIG. 1 is a block diagram of a related art pipeline microprocessor.

Referring to FIG. 1, a block diagram is presented of a related art pipeline microprocessor 100. The microprocessor 100 includes a fetch stage 102, translate stage 104, register stage 106, address stage 108, data/ALU stage 110 and write back stage 112.

Operationally, the fetch stage 102 fetches instructions from memory (not shown) that are to be executed by the microprocessor 100. The translate stage 104 translates, or decodes, the fetched instructions into associated micro instructions, each micro instruction directing the microprocessor 100 to perform a specific subtask related to accomplishment of an overall operation prescribed by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads/writes data from/to memory using the memory address calculated in the address stage 108. The write back stage 112 writes the result of a data read operation, or an ALU operation, to the register file. Thus, macro instructions are fetched by the fetch stage 102 and are decoded into micro instructions by the translate stage 104, and the micro instructions proceed through subsequent stages 106–112 for execution.

Micro instructions move through successive stages of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, flow of micro instructions through the microprocessor pipeline is effectively stalled: preceding stages in the pipeline are precluded from forwarding associated results down the pipeline and succeeding stages, having completed execution of a current micro instruction, sit idle. A stall in the pipeline is referred to as a slip, or a void, and is highly undesirable. In the absence of techniques to diminish the negative effects of slips, it follows then that the speed at which the microprocessor 100 executes a particular application program is significantly influenced by the number of pipeline slips that are encountered during its execution. For this reason, present day microprocessors employ various techniques to minimize the number of pipeline voids. One such technique, branch prediction, is described with reference to FIG. 2.

Figure 2:
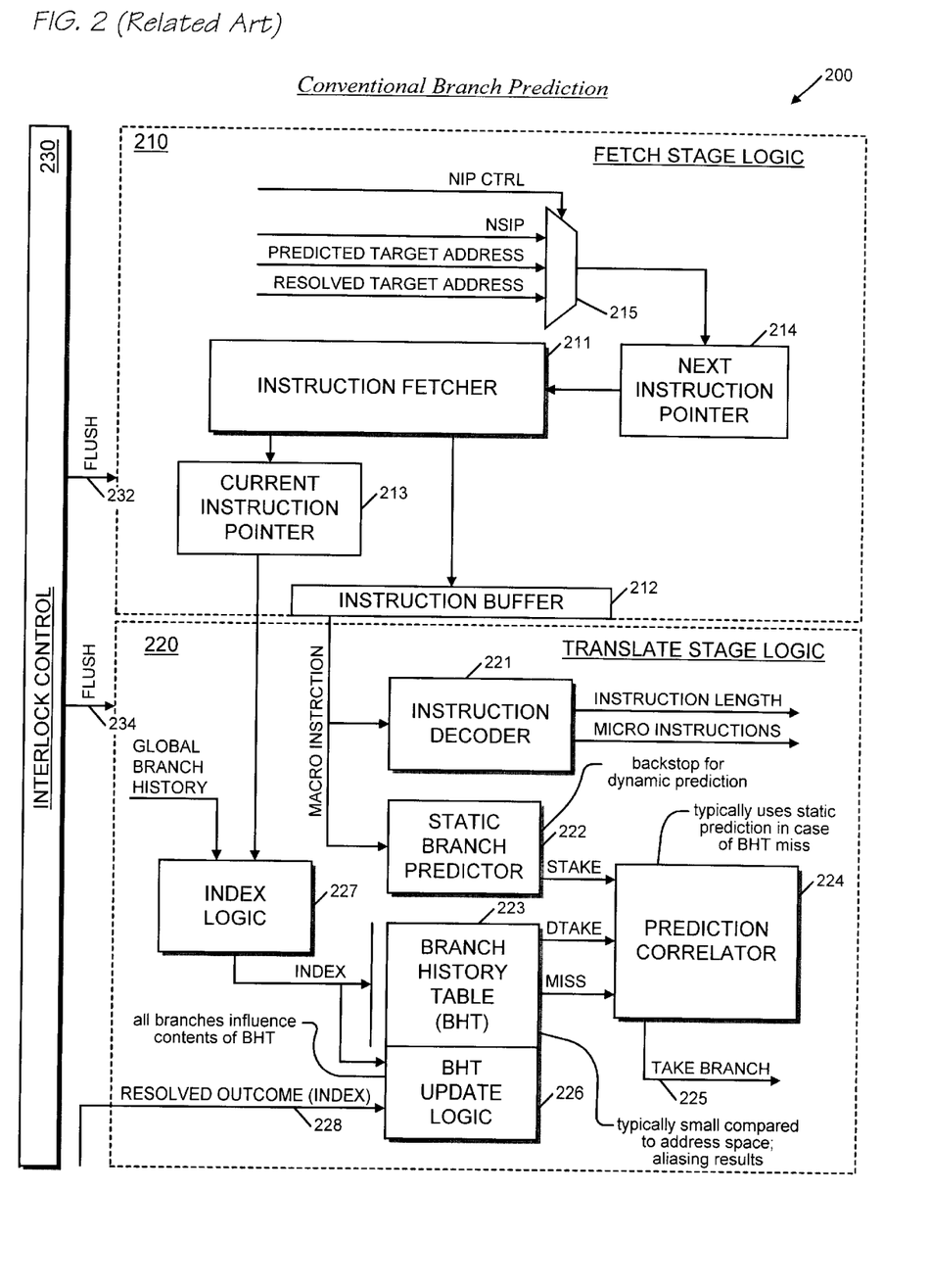
FIG. 2 is a block diagram of a portion of a related art pipeline microprocessor illustrating conventional mechanisms for predicting the outcome of branch instructions.

Referring to FIG. 2, a block diagram of a portion of a related art pipeline microprocessor 200 is presented illustrating conventional mechanisms for predicting the outcome of branch instructions. The microprocessor 200 includes fetch stage logic 210, translate stage logic 220, and interlock control 230. For clarity of discussion, remaining stages of the microprocessor 200 are not shown.

The fetch stage logic 210 has an instruction fetcher 211 that provides sequential macro instructions to an instruction buffer 212 so that the sequential macro instructions are available for retrieval by the translate stage logic 220 during each clock cycle.

The translate stage logic 220 has an instruction decoder 221, or translator 221, and a static branch predictor 222, each of which receive macro instructions provided by the instruction buffer 212. The translate stage logic 220 also includes a branch history table (BHT) 223 which provides outputs to a prediction correlator 224. The translate stage logic 220 additionally includes index logic 227 that provides an output to the branch history table 223 and BHT update logic 226.

The interlock control 230 spans the fetch and translate stages of the microprocessor 200. The interlock control 230 interfaces to the fetch stage logic 210 via flush signal 232. Interface to the translate stage logic 220 is achieved via flush signal 234.

Operationally, a sequential block of macro instructions in a desktop computer are retrieved by the instruction fetcher 211 from external memory (not shown) or an instruction cache (not shown) within the microprocessor 200 and the macro instructions are provided to the instruction buffer 212. The instruction buffer 212 stores several sequential macro instructions that are designated for execution. During each cycle of the pipeline clock, a macro instruction is retrieved from the instruction buffer 212 and is provided to the instruction decoder 221 for translation into associated micro instructions for execution by succeeding stages of the microprocessor 200.

Application programs chiefly execute macro instructions sequentially. That is, execution of a first macro instruction stored in a first address in memory is followed by execution of a second macro instruction stored in a second address. The second address is offset from the first address in memory by a number of bytes, L, where L is the number of bytes required to store the first macro instruction. The number of bytes, L, is also called the length of an instruction. Execution of the second macro instruction is followed by execution of a third macro instruction stored in a third address that follows the second address, and so on.

In addition, a macro instruction is uniquely identified by its corresponding location in memory. The corresponding location of the macro instruction provided each cycle for translation is designated by a current instruction pointer 213. Because macro instructions vary in size, the instruction decoder 221 provides an instruction length output to be used by the fetch stage logic 210 to determine the address of a next sequential instruction. A sum of the current instruction pointer and the current instruction length designates the location of the next sequential instruction, or next sequential instruction pointer (NSIP) The NSIP is one of the inputs provided to a mux 215 in the fetch stage logic 210. If it is determined that the next instruction to be executed is the next sequential instruction, then a next instruction pointer (NIP) control (CTRL) signal directs the mux 215 to provide the NSIP to a next instruction pointer 214. The instruction fetcher 211 fetches macro instructions based upon the contents of the next instruction pointer 214. Hence, macro instructions continue to execute sequentially until a program control transfer instruction is executed.

A program control transfer instruction performs the function that its name implies: sequential instruction execution is temporarily halted and control of the microprocessor 200 is transferred to another area of the application program where, most likely, sequential execution of macro instructions will continue. There are two types of program control instructions. One type unconditionally causes program control flow to be transferred to a different area of memory. Instructions of this type are known as unconditional control transfer instructions, unconditional jump instructions, unconditional branch instructions, or call/return instructions. Other program control instructions transfer program control flow to a different area of memory as a result of a condition being met. Instructions of this type are known as conditional program control transfer instructions, conditional jump instructions, or conditional branch instructions.

A conditional branch is a commonly used program control transfer instruction. For example, a program operating at location X in memory may test an input to the microprocessor 200. If the input satisfies some condition as prescribed by the particular conditional jump instruction being employed, then program control is transferred to location Y. Else, program execution continues to a next sequential macro instruction that follows location X.

Conditional jump micro instructions are evaluated, or resolved, in the data/ALU stage of the microprocessor 200. But, by the time a conditional jump micro instruction proceeds through the data/ALU stage, a next sequential micro instruction is present in the address stage, a micro instruction following the next sequential micro instruction is in the register stage, and so forth. Moreover, because the presumption is that sequential instruction execution will continue following evaluation of the conditional jump micro instruction, in the absence of branch prediction mechanisms, the instruction buffer 212 would also be filled with macro instructions that sequentially follow the conditional jump instruction.

If the evaluation of the condition specified by the conditional branch instruction does not result in the jump, or branch, being taken, then sequential instruction execution continues uninterrupted. If, on the other hand, the condition evaluation results in the branch being taken, then, because sequential instructions have been queued up for execution, many clock cycles are potentially consumed with filling the pipeline with sequential instructions beginning with the instruction that is the target of the branch. Such an instruction is called a branch target instruction, or branch target. Resolution of the conditional branch instruction in the data/ALU stage results in the location of the branch target instruction, or resolved target address, being provided to the mux 215. When resolution of a conditional branch causes the branch to be taken, the NIP CTRL signal causes the resolved target address to be provided to the next instruction pointer 214 so the instruction fetcher 211 can begin fetching sequential instructions from the resolved target address.

To recap, a conditional branch instruction is evaluated in the data/ALU stage. If a condition specified by the instruction is not met, then program control continues to the next sequential instruction. If the condition is met, then program control is transferred to the branch target instruction. To execute the branch, the pipeline must be flushed prior to fetching the branch target instruction. The interlock control 230 asserts the flush signals 232, 234 to accomplish the flush of the fetch stage logic 210 and translate stage logic 220. Following the flush, the pipeline is refilled with sequential instructions beginning with the branch target.

Branch prediction techniques are utilized to minimize the number of clock cycles that are wasted when a conditional branch is taken. In the translate stage, the branch history table 223 maintains a historical record of the outcomes of conditional jump instructions that have been previously executed so that future outcomes of the instructions can be predicted. To access an entry in the branch history table 223, the current instruction pointer (CIP) 213 is provided to the index logic 227 along with a global branch history signal. In turn, the index logic 227 maps the combination of the CIP 213 and the global branch history signal to a specific, but not necessarily unique, entry in the branch history table 223. The global branch history signal is simply a representation of the outcomes of several previously executed branch instructions, regardless of their associated type. Because it is well known that outcomes of successive branch instructions of any type are correlated, the global branch history signal is used to lend an additional level of granularity to the branch history table 223.

To maintain a one-to-one correspondence between all locations in memory and corresponding branch history table entries would require that a branch history table 223 be equal in size to the memory. But, because this is not feasible, various N:1 mapping schemes are employed to balance the functional and performance requirements of branch prediction with the size of the branch history table 223. One type of scheme combines low order bits of the CIP 213 with the global branch history signal to generate an index to a branch history table entry. Several mapping schemes of this type are specifically presented in copending U.S. patent application Ser. No. 09/203844, entitled METHOD AND APPARATUS FOR SPECULATIVELY UPDATING GLOBAL BRANCH HISTORY, having common inventors and having the same assignee, which is hereby incorporated by reference.

The index signal is used to access a particular branch history table entry to predict, based upon previous executions of a corresponding branch instruction, whether it is probable that execution of the corresponding conditional branch instruction will result in a branch being taken or not being taken. If the particular branch history table entry indicates that the branch will be taken, then a signal, DTAKE, is asserted and provided to the prediction correlator 224. If the particular branch history table entry indicates that the branch will not be taken, then DTAKE is not asserted. Because the branch prediction is based upon previous executions of the corresponding branch instruction, it is referred to as a dynamic prediction.

Yet, because the mapping function performed by the index logic 227 is N:1, it is noted that more than one conditional branch instruction can be mapped to the same branch history table entry. This phenomenon is called aliasing. More specifically, because only low order bits of the CIP 213 are provided to the index logic 227, a given branch history table entry may be associated with the outcomes of two or more conditional branch instructions having the same low-order address. If a dynamic prediction is made for one of the conditional branch instructions, the branch history table entry to which it is mapped may reflect the outcomes of other branch instructions that are also mapped to the same entry.

Additionally, when a conditional branch instruction is executed, an associated branch history table entry may not even be available for a dynamic prediction. For instance, if the branch instruction executes for the first time in an application program, it will not necessarily have an associated branch history table entry. Furthermore, some dynamic branch prediction techniques provide for only a limited number of unique entries in the branch history table 223. Thus, when a branch history table 223 is completely filled with unique entries, then subsequent conditional branch instructions are rejected according to a predefined set of rules. In either event, the case does arise where there is not an associated dynamic prediction available to predict a branch. As a result, a miss signal is provided to the prediction correlator 224 indicating that a dynamic prediction for the branch in question is not being provided.

The static branch predictor 222 provides an alternative prediction signal, STAKE, for a conditional branch instruction. This prediction is not based upon the outcomes of previous executions within the application program of a unique conditional branch instruction located at a specific address in memory. Rather, the prediction is based upon observed outcome data for the conditional branch instruction as it has been executed in a wide variety of application programs. The prediction is fixed and does not change. As such, the branch prediction provided by the static branch predictor 222 is referred to as a static branch prediction. The conditional branch instruction itself, rather than the CIP 213, is provided to the static branch predictor 222. The static branch prediction, STAKE, is provided to the prediction correlator 224 for all conditional branch instructions.

The static branch prediction, STAKE, because it is not subject to change as a result of a dynamic execution environment, is most often used as a fallback measure when there is no dynamic branch prediction available for a given branch instruction. Hence, the prediction correlator 224, in a conventional microprocessor 200, will receive the dynamic prediction and the static prediction. The prediction correlator 224 favors the dynamic prediction over the static prediction and generates a branch prediction signal 225, TAKE BRANCH. But, if the miss signal is asserted, indicating that a dynamic branch prediction is not available, then the static branch prediction, STAKE, is used to generate the branch prediction signal 225.

There are several different techniques used to generate both dynamic branch predictions and static branch predictions. Several of these different techniques are described in copending U.S. patent application Ser. No. 09/203900, entitled METHOD AND APPARATUS FOR PERFORMING BRANCH PREDICTION UTILIZING BRANCH TEST TYPE, having common inventors and having the same assignee, which is hereby incorporated by reference. Yet, regardless of the specific techniques employed, one skilled in the art will appreciate that a conventional microprocessor 200 favors dynamic predictions over static predictions: a static prediction is used to predict a branch outcome only when a dynamic prediction is unavailable.

The prediction correlator 224, via the branch prediction signal 225, directs the microprocessor either to speculatively take a corresponding branch to a branch target instruction or to continue execution of sequential instructions. If the branch is predicted to be taken, the translate stage logic 220 also provides a predicted target address indicating the location in memory for the branch target instruction. The predicted target address is provided to the mux 215. For execution of a speculative branch, i.e., a branch that is predicted taken by the prediction correlator 224, the NIP CTRL signal directs the mux 215 to provide the predicted target address to the next instruction pointer 214.

It is noted that the branch prediction, because the prediction is made in the translate stage, cannot precisely indicate whether or not the branch will be taken or not. This is because the associated branch condition is not evaluated until the data/ALU stage. In addition, the resolved target address of the conditional branch instruction cannot be precisely determined in the translate stage. This is why a branch that is predicted to be taken by logic in the translate stage is known as a speculative branch.

One skilled in the art will appreciated that different microprocessors utilize different macro instructions to implement conditional branches. Also, as is alluded to above, there are several different techniques used to speculate whether a conditional branch will be taken or not. Furthermore, one skilled will understand that that methods for providing a branch target address vary. A comprehensive discussion of conditional branch prediction methodology is beyond the scope of this application. It suffices to note that most present day microprocessors employ some form of branch prediction logic in the translate stage to minimize the number of clock cycles that are associated with performing a conditional branch.

Hence, if a conditional branch is predicted to be taken, then the branch prediction signal 225 and target address are provided to the fetch stage logic. 210. As a result, the fetch stage logic 210 flushes the contents of the instruction buffer 212 and begins fetching sequential instructions from the predicted target address. If the conditional branch is predicted to be not taken, then sequential instructions following the conditional branch instruction are allowed to proceed through the pipeline.

As a conditional branch instruction proceds through the data/ALU stage, its associated condition is evaluated and a result of the evaluation determines the true outcome of the conditional branch instruction. The true outcome is also known as a resolved outcome. The resolved outcome of a conditional branch instruction is fed back to the BHT update logic 226 via bus 228 so that the resolved outcome can be added to the historical outcome data in the branch history table entry to which the conditional branch instruction was mapped. The BHT update logic 226 updates the branch history table entry associated with the resolved outcome.

But, it is equally important to note that resolution of the conditional branch instruction either confirms or contradicts the prediction provided by the prediction correlator 224. Correctly predicting that a conditional branch will occur typically allows a conditional jump instruction to be executed in only two clock cycles: one cycle to flush the instruction buffer 212 and one cycle to fill it with macro instructions beginning with a branch target instruction at the predicted target address. Yet, incorrectly predicting a conditional jump requires more cycles to execute than would be required if no branch prediction technique had been used in the first place. The 1-cycle penalty is incurred flushing early stages in the microprocessor 200 in order to begin fetching at the predicted target address as a result of the speculative branch being directed by the branch prediction signal 225. Though, when resolution of the conditional branch instruction contradicts the prediction, then pipeline stages must be flushed again, this time up to the data/ALU stage, and the pipeline must be refilled with the correct instructions. Because the delay caused by an inaccurate branch prediction is worse than the delay incurred in the absence of any prediction at all, it is extremely important that a branch prediction be accurate. Accurate branch predictions can result in significant performance gains. Conversely, inaccurate branch predictions detrimentally affects the performance of the microprocessor 200.

The accuracy of branch predictions is diminished when aliasing occurs or when a dynamic branch prediction is unavailable, that is, the branch history table 223 is full. For example, if a given branch history table entry contains data corresponding to resolved outcomes of two aliased conditional branch instructions, a first instruction exhibiting a bias toward being taken and a second instruction exhibiting a bias toward being not taken, then a dynamic prediction for either instruction based upon the resolved outcomes of the other instruction would be inaccurate. In the latter case, if the branch history table 223 is full, it could potentially be filled with many branch instructions exhibiting biases toward a particular outcome. As a result, branch instructions that do not exhibit such biases would be cast out and prediction of their outcome is relegated to a fallback static branch prediction by the static branch predictor 222. In either case, one skilled in the art will observe that the tendencies, or biases, of conditional branch instructions toward being taken or not taken contributes to the overall accuracy of branch predictions in the microprocessor 200. How these tendencies negatively impact the performance of a microprocessor 200 having conventional branch prediction mechanisms is more specifically discussed with reference to FIG. 3.

Figure 3:
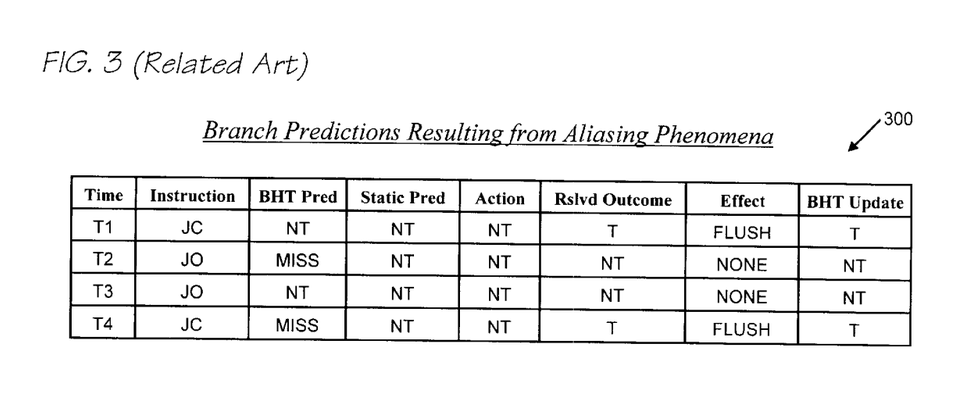
FIG. 3 is a table illustrating the effects of predicting branches with the microprocessor of FIG. 2.

Referring to FIG. 3, a table 300 is provided illustrating the effects of predicting branches with the microprocessor 200 of FIG. 2. The table traces the execution of two x86-compatible conditional branch instructions: jump if carry bit set, designated by JC, and jump if overflow bit set, designated by JO. The JO instruction exhibits a bias toward not being taken. The JC instruction does not exhibit a significant bias towards any outcome; a current outcome in a given application program for the JC instruction is, however, notably correlated to prior outcomes in the recent past. The carry bit and the overflow bit refer to bits in a register in the x86-compatible microprocessor 200 that reflect the result of a previously executed arithmetic operation. Execution of the instructions are traced with respect to times T1 through T4, time T4 being later than time T1. Contents of the column entitled BHT Pred denote the output of the branch history table 223, contents of the column entitled Static Pred denote the output of the static branch predictor 222, contents of the column entitled Action denote the output of the prediction correlator 225, contents of the column entitled Rslvd Outcome denote the resolved outcome of the conditional branch instruction, contents of the column entitled Effect portray the effect of the resolved outcome in view of the action directed by the prediction correlator 225, and contents of the column entitled BHT Update denote the how the branch history table 223 is updated as a result of the conditional branch instruction being resolved.

At time T1, conditional branch instruction JC is provided to the translate stage logic 220. The index logic 227 generates an index to access a corresponding branch history table entry for JC. The branch history table 223 provides a dynamic branch prediction to the prediction correlator 224 of Not Taken (NT) via DTAKE signal. In addition, the static branch predictor 222 provides a static branch prediction, NT. The prediction correlator 224 favors the dynamic prediction over the static prediction, in this instance both are the same, resulting in a speculative branch being not taken. Thus, sequential instruction execution is allowed to continue following the JC instruction. Resolution of the JC instruction prior to time T2 contradicts the branch prediction provided by the prediction correlator 224. The effect is that the microprocessor pipeline must be flushed and refilled with instructions beginning with the branch target instruction associated with the JC instruction. Following resolution of the JC instruction, the resolved outcome, Taken (T), is provided to the BHT update logic 226 so that the corresponding branch history table entry for JC can reflect the recent outcome. In the branch prediction scheme used in this example, such an update will result in a dynamic branch prediction of Taken (T) the next time the corresponding branch history table entry is accessed.

At time T2, conditional branch instruction JO is provided to the translate stage logic 220. The index logic 227 generates an index to access the same branch history table entry as was generated for JC. Yet, at this point, the branch history table 223 is full and is thus unable to provide a prediction. Hence, the branch history table 223 provides a miss signal to the prediction correlator 224. In addition, the static branch predictor 222 provides a static branch prediction for the JO instruction: NT. The static prediction is NT because the JO instruction exhibits a bias towards being not taken. The prediction correlator 224 uses the static prediction as a fallback, in this instance an accurate prediction because of the exhibited outcome bias of the JO instruction, resulting in a speculative branch being not taken. Thus, sequential instruction execution is allowed to continue following the JO instruction. Resolution of the JO instruction prior to time T3 confirms the branch prediction provided by the prediction correlator 224. There is no detrimental effect on microprocessor performance resulting from confirmation of the static prediction for the JO instruction. Following resolution of the JO instruction, the resolved outcome, NT, is provided to the BHT update logic 226. Most dynamic branch prediction schemes, because the size of a branch history table 223 is smaller than the address space of the microprocessor 200, cast out entries associated with a miss when the miss occurs. Hence, for this example, the miss caused by the JO instruction caused the entry associated with the JC instruction to be cast out. As a result, the resolved outcome of the JO instruction, NT, is placed into the corresponding branch history table entry.

At time T3, conditional branch instruction JO is provided again to the translate stage logic 220. This time, the branch history table 223 provides a dynamic branch prediction to the prediction correlator 224 of NT. In addition, the static branch predictor 222 provides a static branch prediction, NT. The prediction correlator 224 favors the dynamic prediction over the static prediction and allows sequential instruction execution to continue. Resolution of the JO instruction prior to time T4 confirms the branch prediction provided by the prediction correlator 224. Following resolution of the JO instruction, the resolved outcome, NT, is provided to the BHT update logic 226 so that the corresponding branch history table entry for JO can reflect the recent outcome.

At time T4, conditional branch instruction JC is provided again to the translate stage logic 220. This time, the branch history table 223 provides a miss signal to the prediction correlator 224. In addition, the static branch predictor 222 provides a static branch prediction, NT. The prediction correlator 224 uses the fallback static prediction and allows sequential instruction execution to continue. But this time, resolution of the JC instruction contradicts the NT prediction provided by the prediction correlator 224. The effect is that the microprocessor pipeline must be flushed and refilled with instructions beginning with the branch target instruction associated with the JC instruction.

It is significant to note that the accuracy of the prediction for the unbiased outcome conditional branch instruction, JC, is negatively influenced by virtue of the presence of the biased outcome conditional branch instruction, JO. In this example, the microprocessor 200 employs a hit/miss algorithm for dynamic branch prediction where information pertaining to only one conditional branch instruction is allowed to be present at any given instant in a branch history table entry. Thus, outcome information pertaining to the branch for JC at time T1 is cast out of the table due to execution of the branch for JO at time T2. When JC is fetched again at time T4, its previous outcome information is therefore not available to be used in a dynamic branch prediction.

Another dynamic branch prediction technique allows information pertaining to multiple conditional instructions to share a particular branch history table entry. Under such a scheme in the example of FIG. 3, rather than indicating a miss at time T2 for the JO instruction, the index for JO would be aliased to the branch history table entry which was updated at time T1 to reflect the resolved outcome of execution of the JC instruction, T. Under the shared entry scheme, an ensuing dynamic prediction would be made for the JO branch at time T2 that would cause a speculative branch to be taken. But, because the resolved outcome is actually NT, this would result in a pipeline flush when JO is resolved.

Other approaches to dynamic prediction in the presence of aliasing utilize an agree/disagree scheme wherein outcome information is maintained in the branch history table 223 regarding whether a subsequent dynamic prediction should agree or disagree with a static prediction based upon a current resolved outcome. These approaches are described in copending U.S. patent application Ser. No. 09/203884, entitled METHOD AND APPARATUS FOR PERFORMING BRANCH PREDICTION COMBINING STATIC AND DYNAMIC BRANCH PREDICTORS, having common inventors and having the same assignee, which is hereby incorporated by reference.

One skilled in the art will appreciate that, because of the limited size of the branch history table 223, the accuracy of dynamic predictions for unbiased outcome conditional branch instructions, i.e., those instructions whose future outcomes truly depend upon previous outcomes, is negatively impacted by the presence of outcome information in the table 223 pertaining to biased outcome conditional branch instructions, i.e., those instructions whose future outcomes can be more accurately predicted by observing parameters and operands within the instructions. This problem can cause extensive performance degradation for an application program having a significant number of biased outcome conditional instructions that are mapped to the same branch history table entries as unbiased outcome conditional branch instructions.

The present invention overcomes the problem of diminished branch prediction accuracy by providing a mechanism for identifying biased outcome conditional branch instructions, employing a static predict ion mechanism for these instructions, directing that the static prediction for these instructions be favored over any dynamic prediction that may be provided, and precluding resolved outcome data associated with these instructions from diluting the accuracy of branch history table entries that are associated with unbiased outcome conditional branch instructions. The present invention is more particularly described with reference to FIGS. 4 through 7.

Figure 4:
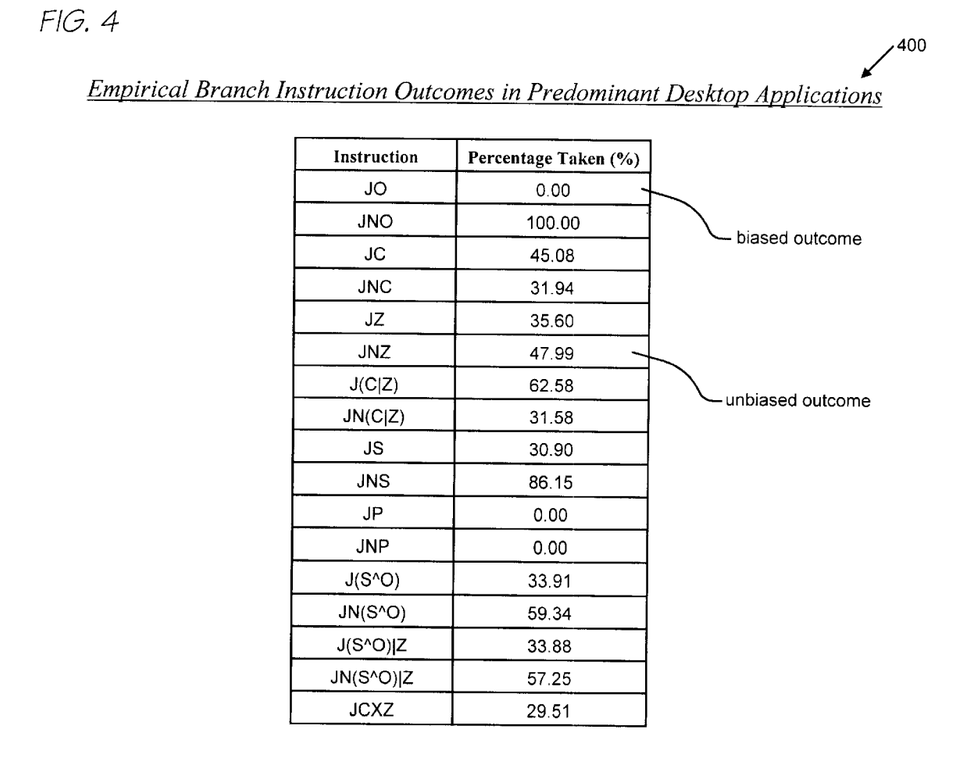
FIG. 4 is a table presenting empirical branch instruction outcomes as observed in predominant desktop application programs.

Referring to FIG. 4, a table 400 is presented illustrating empirical conditional branch instruction outcomes as observed in predominant desktop application programs. The table 400 depicts percentages of taken branches for various test types of x86-compatible conditional branch instructions. The table 400 reflects data collected by the present inventors regarding execution of the x86-compatible conditional branch instructions on an x86-compatible microprocessor that is executing predominant desktop application programs such as Microsoft® Excel, Word, PowerPoint, and Access, as well as Lotus® 1-2-3, WordPerfect®, and Netscape® Communicator. The present inventors have advantageously observed that some test types of x86-compatible conditional jump instructions are strongly biased toward one outcome or the other.

The test types for which data were collected correspond to x86 architecture test types and are designated in table 400 according to commonly recognized x86 instruction mnemonics. The test types are overflow (JO), not overflow (JNO), carry (JC), not carry (JNC), zero (JZ), not zero (JNZ), carry or zero (J(C|Z)), not carry or zero (JN(C|Z)), sign (JS), not sign (JNS), parity (JP), not parity (JNP), sign and overflow not equal (J(S^O)), sign and overflow equal (JN(S^O)), sign and overflow not equal or zero (J(S^O)|Z), sign and overflow equal or zero (JN(S^O)|Z), and CX register zero (JCXZ). The test types correspond to status flag bits in the EFLAGS register of an x86-compatible microprocessor. Although x86-compatible test types have been used for this example, it is noted that a given microprocessor may support other test types. One skilled in the art will appreciate that the present invention is not restricted to a particular set of test types supported as shown in FIG. 4; empirical outcome data for any set of conditional branch instructions may be obtained and evaluated to determine outcome bias.

For each test type, the percentage of branches taken for each test type is shown. As may be observed, a first subset of the test types, JNO, JNS and J(C|Z), exhibit a bias toward being taken. A second subset of the test types, JNC, JZ, JN(C|Z), J(S^O), and J(S^O)|Z, exhibit a bias toward being not taken. The remaining test types exhibit only marginal bias toward one outcome or the other and are hence categorized as unbiased outcome conditional branch instructions. These observations serve as the basis for providing branch predictions in accordance with the present invention.

To elaborate the observations concerning outcomes as tabulated in FIG. 4, a branch prediction for one of the biased outcome conditional branch instructions, say JO, can be made with a high degree of accuracy based simply upon the outcome data shown in the table 400, regardless of where the instruction is located in an application program or what its previous outcomes happen to be. For the JO instruction, it is more effective, particularly from a performance perspective, to mandate a branch prediction of not taken each time it is executed. The data of FIG. 4 show that such a prediction can be made with 100 percent accuracy. Furthermore, historical outcome data for any of the biased conditional branch instructions are unnecessary and, as alluded to above, tend to diminish the accuracy of dynamic predictions for aliased unbiased conditional branch instructions.

Figure 5:
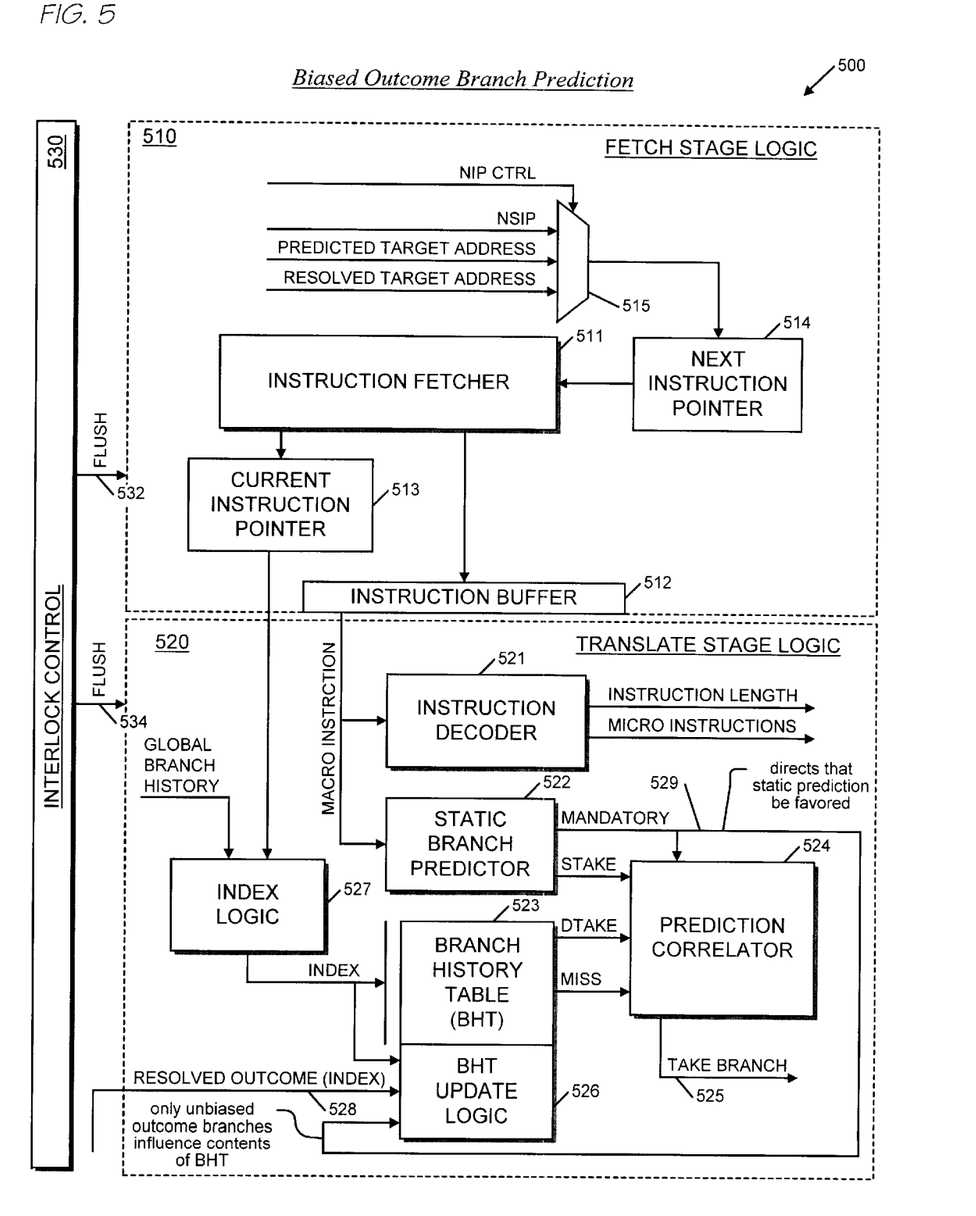
FIG. 5 is a diagram of a portion of a related art pipeline microprocessor according to the present invention for predicting the outcome of branch instructions.

Now referring to FIG. 5, a diagram is presented of a portion of a related art pipeline microprocessor 500 according to the present invention for predicting the outcome of branch instructions. The microprocessor 500 includes fetch stage logic 510, translate stage logic 520, and interlock control 530. For clarity of discussion, remaining stages of the microprocessor 500 are not shown. The microprocessor incorporates elements similar to those described with reference to FIG. 2. Like elements have like references with the hundreds digit replaced by a 5. In place of the static branch predictor 222 and prediction correlator 224, the microprocessor 500 according to the present invention has a biased static branch predictor 522 and biased prediction correlator 524. In addition, the biased static branch predictor 522 provides a mandatory signal 529 that is provided to both the biased prediction correlator 524 and BHT update logic 526.

For execution of sequential instructions, the microprocessor 500 according to the present invention functions like the microprocessor 200 of FIG. 2. Improved performance is achieved for execution of conditional branch instructions. The present invention can be employed in a microprocessor 500 that utilizes a hit/miss dynamic branch prediction scheme, thus having a limited number conditional branch instructions whose outcome history is maintained in the branch history table 523, or a dynamic prediction scheme that allows aliasing.

When a conditional branch instruction is fetched from the instruction buffer 512, its CIP 513 is provided to the index logic 527 along with the global branch history. These two parameters are combined to generate an index into the branch history table 523. Concurrently, the conditional branch instruction itself is provided to the biased static branch predictor 522. A static prediction is always made for conditional branches. The prediction is provided to the biased prediction correlator 524. In addition, if the conditional branch instruction is a biased outcome conditional branch instruction, the mandatory signal 529 is asserted, thus directing the biased prediction correlator to favor the static prediction over any dynamic prediction which may be provided.

A dynamic prediction for the conditional branch instruction is provided to the biased prediction correlator 524 as has been previously discussed via DTAKE and MISS signals.

The biased prediction correlator 524 favors a dynamic branch prediction over a static branch prediction, unless the mandatory signal 529 is asserted. If the mandatory signal 529 is asserted, then the static branch prediction is favored over the dynamic branch prediction. Thus, the state of the branch prediction signal 525, TAKE BRANCH, directs the microprocessor 500 to execute a speculative branch or to continue sequential instruction execution.

The resolved outcome of a conditional branch instruction is fed back to the BHT update logic 526 via bus 528 so that the resolved outcome can be added to the historical outcome data in the branch history table entry to which the conditional branch instruction was mapped. The BHT update logic 526 updates the branch history table entry associated with the resolved outcome, unless the mandatory signal 529 associated with the conditional branch instruction was asserted when the branch prediction was made. If the mandatory signal 529 was asserted at the time the branch prediction was made, then the branch history table is not updated with the outcome of the resolved conditional branch instruction. Hence, the outcome results of biased outcome conditional branch instructions are precluded from diminishing the accuracy of entries in the branch history table 523. In the case of a hit/miss dynamic prediction scheme, more space is made available in the branch history table 523 for entries corresponding to unbiased outcome conditional branch instructions. For a shared entry scheme, the negative effects of aliasing are reduced. In either case, the overall accuracy of branch predictions is improved, thus boosting the performance of the microprocessor 500. How the performance is boosted in the presence of biased outcome conditional branch instructions is more specifically discussed with reference to FIG. 6.

Figure 6:
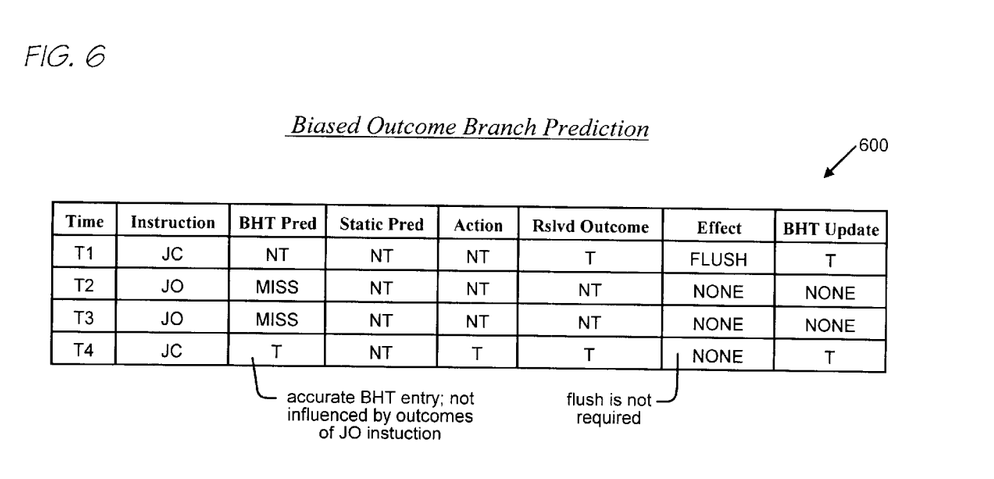
FIG. 6 is a table illustrating the effects of predicting branches with the microprocessor of FIG. 5.

Referring to FIG. 6, a table 600 is provided illustrating the effects of predicting branches with the microprocessor 500 of FIG. 5. The table 600 traces the execution of the two x86-compatible conditional branch instructions discussed with reference to FIG. 2: jump if carry bit set, designated by JC, and jump if overflow bit set, designated by JO. As discussed with reference to FIG. 4, the JO instruction exhibits an 100 percent bias towards being not taken. The JC instruction exhibits only a 45 percent bias towards being taken, which indicates that a current outcome in a given application program for the JC instruction is correlated to prior outcomes in the recent past. Execution of the instructions are traced with respect to times T1 through T4. Column headings and contents in the table 600 correspond to headings and contents as described with reference to FIG. 3.

At time T1, unbiased outcome conditional branch instruction JC is provided to the translate stage logic 520. The index logic 527 generates an index to access a corresponding branch history table entry for JC. The branch history table 523 provides a dynamic branch prediction to the biased prediction correlator 524 of Not Taken (NT) via DTAKE signal. In addition, the biased static branch predictor 522 provides a static branch prediction, NT. The biased prediction correlator 524 favors the dynamic prediction over the static prediction, in this instance both are the same, resulting in a speculative branch being not taken. Thus, sequential instruction execution is allowed to continue following the JC instruction. Resolution of the JC instruction prior to time T2 contradicts the branch prediction provided by the biased prediction correlator 524. The effect is that the microprocessor pipeline must be flushed and refilled with instructions beginning with the branch target instruction associated with the JC instruction. Following resolution of the JC instruction, the resolved outcome, Taken (T), is provided to the BHT update logic 526 so that the corresponding branch history table entry for JC can reflect the recent outcome. In the branch prediction scheme used in this example, such an update will result in a dynamic branch prediction of Taken (T) the next time the corresponding branch history table entry is accessed.

At time T2, biased outcome conditional branch instruction JO is provided to the translate stage logic 220. The index logic 527 generates an index to access the same branch history table entry as was generated for JC. Yet, at this point, the branch history table 523 is full and is thus unable to provide a prediction. Hence, the branch history table 523 provides a miss signal to the biased prediction correlator 524. In addition, the biased static branch predictor 522 provides a static branch prediction for the JO instruction: NT. And, because JO is a biased outcome conditional branch instruction, the mandatory signal 529 is asserted. The biased prediction correlator 224 favors the static prediction, resulting in a speculative branch being not taken. Thus, sequential instruction execution is allowed to continue following the JO instruction. Resolution of the JO instruction prior to time T3 confirms the branch prediction provided by the biased prediction correlator 524. Following resolution of the JO instruction, the resolved outcome, NT, is provided to the BHT update logic 526. But, because the mandatory signal 529 was asserted for JO, no the branch history table is not updated, thus preserving the outcome history of the unbiased outcome conditional branch instruction, JC.

At time T3, biased outcome conditional branch instruction JO is provided again to the translate stage logic 520. Consequently, the branch history table 523 provides miss signal and the biased static branch predictor 522 provides a static branch prediction, NT. In addition, the mandatory signal 529 is asserted. The biased prediction correlator 524 favors the static prediction and allows sequential instruction execution to continue. Resolution of the JO instruction prior to time T4 confirms the branch prediction provided by the biased prediction correlator 524. Following resolution of the JO instruction, the resolved outcome, NT, is provided to the BHT update logic 526, but the corresponding branch history table entry for JO is not updated because the mandatory signal 529 was asserted when its branch was predicted. Hence, the the outcome history of the unbiased outcome conditional branch instruction, JC, executed at time T1, remains preserved in the branch history table 523.

At time T4, the unbiased conditional branch instruction JC is provided again to the translate stage logic 520. This time, the branch history table 523 provides a dynamic prediction of T to the biased prediction correlator 524. In addition, the biased static branch predictor 522 provides a static branch prediction, NT. Because the mandatory signal 529 is not asserted for the JC instruction, the biased prediction correlator 224 favors the dynamic prediction over the static prediction and directs the microprocessor 500 to execute a speculative jump to the target address associated with the JC instruction. Advantageously, resolution of the JC instruction confirms the T prediction provided by the biased prediction correlator 524. The effect is that the microprocessor pipeline was speculatively filled with instructions beginning with the branch target instruction associated with the JC instruction. In other words, because results of the outcomes of the biased outcome conditional branch instruction, JO, were not allowed to dilute the contents of the branch history table 523, an accurate prediction for the unbiased outcome conditional branch instruction, JC, was obtained. In contrast to the example of FIG. 3, a flush of the pipeline is not required the when JC executes a second time at time T4.

Figure 7:
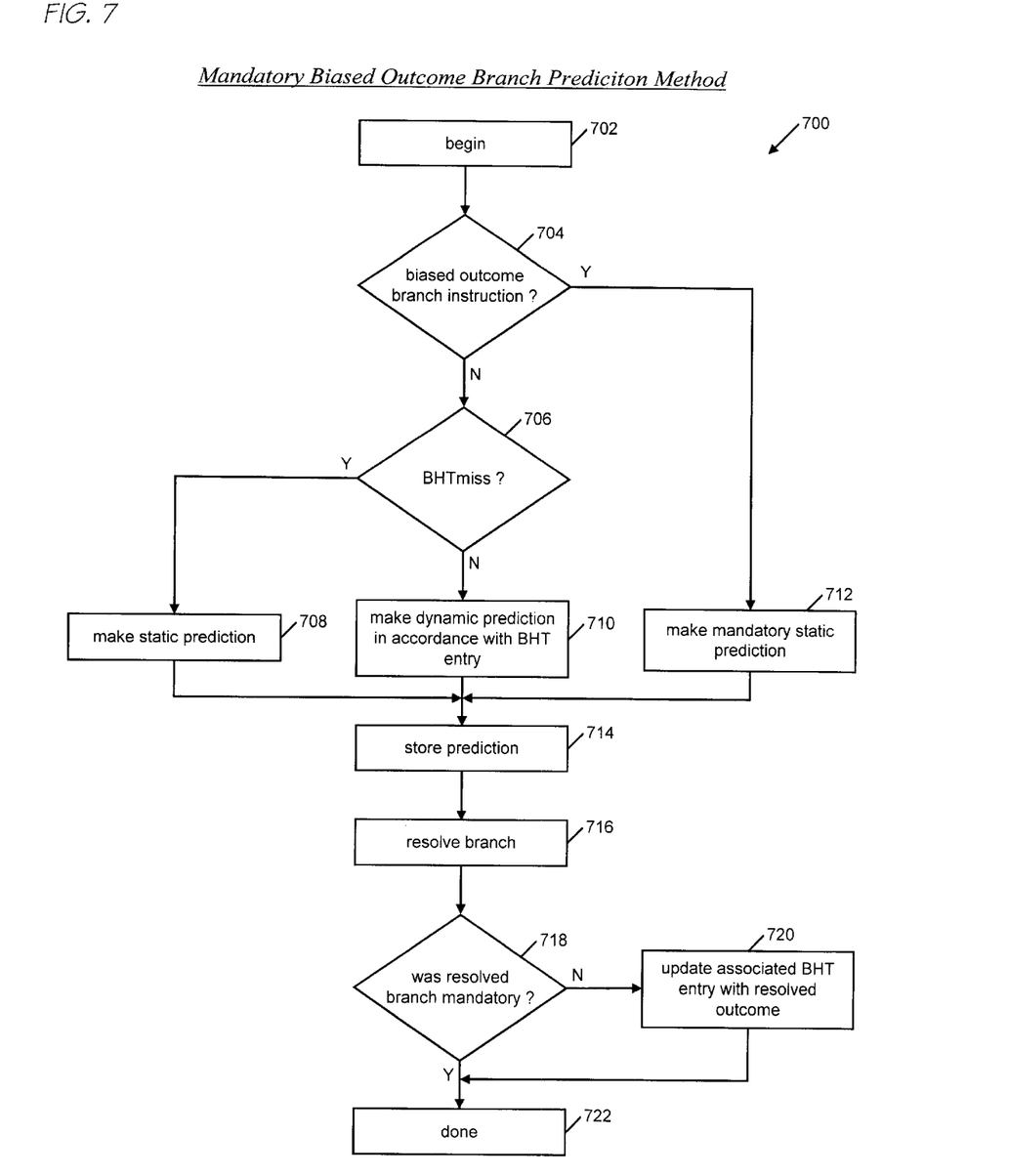
FIG. 7 is a flow chart of a method according to the present invention for predicting the outcome of branch instructions in a pipeline microprocessor.

Now referring to FIG. 7, flow chart 700 is presented of a method according to the present invention for predicting the outcome of branch instructions in a pipeline microprocessor.

Flow begins at block 702 where a conditional branch instruction is fetched from an instruction buffer and is provided to translate stage logic. Flow then proceeds to decision block 704.

At decision block 704, the conditional branch instruction is evaluated to determine if it is a biased outcome conditional branch instruction. If it is, then flow is directed to block 712. If it is not a biased outcome conditional branch instruction, then flow proceeds to decision block 706.

At decision block 706, a branch history table is accessed to determine if a dynamic branch prediction is available for the conditional branch instruction. If the dynamic prediction is not available, i.e., a miss is encountered, then flow proceeds to block 708. If a dynamic branch prediction is available, then flow proceeds to block 710.

At block 708, because a miss was encountered when accessing the branch history table, a static branch prediction is made for the conditional branch instruction. The microprocessor is directed to either take or not take a speculative branch based upon the static branch prediction. Flow then proceeds to block 714.

At block 710, because a miss was not encountered when accessing the branch history table, a dynamic branch prediction is made for the conditional branch instruction based upon contents of a corresponding an entry in the branch history table. The microprocessor is directed to either take or not take a speculative branch based upon the dynamic branch prediction. Flow then proceeds to block 714.

At block 712, because the evaluation in block 704 indicated that the conditional branch instruction was a biased outcome conditional branch instruction, a mandatory static branch prediction is provided. In addition, the microprocessor is directed to favor the static branch prediction for the biased outcome conditional branch instruction. The microprocessor is directed to either take or not take a speculative branch based upon the mandatory static branch prediction. Flow then proceeds to block 714.

At block 714, the branch prediction associated with the conditional branch instruction is saved for future reference. Flow then proceeds to block 716.

At block 716, the conditional branch instruction executes through resolution in later stages of the microprocessor. A resolved outcome for the conditional branch is obtained based upon evaluation of a specified condition. Flow then proceeds to decision block 718.

At decision block 718, the prediction data saved at block 714 are retrieved and evaluated to determine if a mandatory static branch prediction was made, thus indicating that the conditional branch instruction is a biased outcome conditional branch instruction. If a mandatory static branch prediction was made, then flow proceeds to block 722, precluding update to the branch history table. If not, then flow proceeds to block 720.

At block 720, since the conditional branch instruction was not a biased outcome conditional branch instruction, the corresponding branch history table entry is updated. Flow then proceeds to block 722.

At block 722, the method completes.

Although the present invention and its objects, features, and advantages have been described in detail, other embodiments are encompassed by the invention. For example, the present invention has been particularly described in terms of a biased outcome static branch predictor that bases its prediction on outcome data corresponding to test type. Yet, there are other operands within a conditional branch instruction whose state may yield more accurate static branch predictions. For example, many conditional branch instructions are more biased toward one outcome if the branch is backwards, i.e., the branch target instruction is stored in a lower memory address than the conditional branch instruction. Such indication can be obtained by evaluating the conditional branch instruction when it is provided to the biased static branch predictor. The relevant aspects of the present invention include such evaluations and will thus provide a mandatory static branch prediction by evaluating other aspects of the conditional branch instruction as well as test type.

In the future, other statistical indicators may become relevant to determining if a conditional branch instruction has a biased outcome and to predicting the outcome given those indicators. For example, the particular application program that is executing on a microprocessor may be relevant. The present invention comprehends such indications. Indeed, the mandatory static branch prediction obtained may be based upon a number of these indicators outside of contents of a branch history table.

Furthermore, although one embodiment of the invention is described with respect to an x86-compatible microprocessor, it will be clear to one skilled in the art that the present invention may be applied to other microprocessor architectures which do not utilize the x86 instruction set. Therefore, the present disclosure is not intended to be limited to application within the x86 architecture. Additionally, although embodiments are described which indicate subsets of test types for which conditional branch instructions are categorized as having biased outcomes, the present invention is not limited to the particular subsets indicated. Rather, the present invention is directed broadly to the mandatory favoring of a static prediction of branch outcome based on the criteria defined by a designer, in particular the outcomes of conditional branch instructions when executed within predominately used application programs.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A static branch prediction mechanism for predicting branches in a microprocessor, comprising:
   a static branch predictor, for receiving branch instructions from an instruction buffer, and for identifying a biased outcome branch instruction, and for providing a static branch prediction for said biased outcome branch instruction, said static branch prediction based upon observed outcome data corresponding to said biased outcome branch instruction, and for generating a precedence signal to indicate that said static branch prediction takes precedence over a dynamic branch prediction provided by a corresponding branch history table entry;
   a prediction correlator, coupled to said static branch predictor and a branch history table, for receiving said precedence signal, and for directing the microprocessor to execute a speculative branch in accordance with said static branch prediction or said dynamic branch prediction; and
   branch history table update logic, coupled to said static branch predictor and said precedence signal, for updating branch history entries in said branch history table following resolution of said branch instructions, wherein branch history entries corresponding to resolved biased outcome branch instructions are not updated, and wherein said precedence signal directs said branch history table update logic to preclude update of said corresponding branch history table entry.

2. The static branch prediction mechanism as recited in claim 1, wherein said biased outcome branch instruction is one of a predefined subset of said branch instructions that specify conditional tests for the microprocessor.

3. The static branch prediction mechanism as recited in claim 1, wherein said conditional tests comprise overflow, zero, carry, parity, and sign.

4. The static branch prediction mechanism as recited in claim 3, wherein said static predictor provides said static branch prediction based upon a displacement sign within said biased outcome branch instruction.

5. The static branch prediction mechanism as recited in claim 1, wherein, if said static branch prediction is predicted taken, the microprocessor executes said speculative branch to a branch target address in accordance with said static branch prediction.

6. The static branch prediction mechanism as recited in claim 5, wherein, if said static branch prediction is predicted not taken, the microprocessor does not execute said speculative branch, but rather continues sequential instruction execution.

7. The static branch prediction mechanism as recited in claim 6, wherein, if said precedence signal indicates that said static branch prediction does not take precedence over said dynamic branch prediction, the microprocessor executes said speculative branch in accordance with said dynamic branch prediction.

8. The static branch prediction mechanism as recited in claim 1, wherein said branch history update logic comprises:
   a first input, configured to receive a resolved branch outcome for said branch instruction indicating whether a branch was taken or not; and
   a second input, coupled to said first input, configured to receive said precedence signal provided by said static branch predictor;
   wherein said branch history entries are updated only if said precedence signal indicates that said static branch prediction did not take precedence over said dynamic branch prediction.

9. The static branch prediction mechanism as recited in claim 8, wherein said branch history entries each comprise a plurality of bits indicating whether a plurality of previous corresponding branches were taken or not taken.

10. The static branch prediction mechanism as recited in claim 9, wherein said corresponding branch history entries are indexed by low order bits of an instruction pointer for said branch instructions.

11. A branch prediction apparatus, comprising:
   a static branch predictor, configured to identify a biased outcome branch instruction, and configured to provide a static branch prediction for said biased outcome branch instruction, wherein said static branch prediction is based upon observed outcome data corresponding to said biased outcome branch instruction rather than outcomes corresponding to previous executions of said biased outcome branch instruction, said static branch predictor comprising:
      a static prediction output, for indicating whether a first speculative branch to a first target address is to be taken or not taken; and a precedence output, for indicating that said static branch prediction is to take precedence over a dynamic branch prediction, said dynamic branch prediction provided by a corresponding entry in a branch history table, and wherein said precedence output directs branch update logic to preclude update of said corresponding entry following resolution of said biased outcome branch instruction; and a prediction correlator, coupled to said static branch predictor and said branch history table, configured to direct a next instruction pointer to indicate a next sequential instruction address, said first target address, or a second target address.

12. The branch prediction apparatus as recited in claim 11, wherein said biased outcome branch instruction is one of a predefined subset of branch instructions specifying conditional tests.

13. The branch prediction apparatus as recited in claim 12, wherein said conditional tests comprise overflow, zero, carry, parity, and sign.

14. The branch prediction apparatus as recited in claim 13, wherein said static predictor provides said static branch prediction based upon a displacement sign within said biased outcome branch instruction.

15. The branch prediction apparatus as recited in claim 14, wherein, if said static prediction output indicates that said first speculative branch is to be taken, and if said precedence output indicates that said static branch prediction is to take precedence over said dynamic branch prediction, then said prediction correlator directs said next instruction pointer to indicate said first target address.

16. The branch prediction apparatus as recited in claim 15, wherein, if said static prediction output indicates that said first speculative branch is to be not taken, and if said precedence output indicates that said static branch prediction is to take precedence over said dynamic branch prediction, then said prediction correlator directs said next instruction pointer to indicate said next sequential instruction address.

17. The branch prediction apparatus as recited in claim 16, wherein, if said precedence output indicates that said static branch prediction does not take precedence over said dynamic branch prediction, and if said dynamic branch prediction indicates that a second speculative branch is to be not taken, then said prediction correlator directs said next instruction pointer to indicate said next sequential instruction address.

18. The branch prediction apparatus as recited in claim 17, wherein, if said precedence output indicates that said static branch prediction does not take precedence over said dynamic branch prediction, and if said dynamic branch prediction indicates that a second speculative branch is to be taken, then said prediction correlator directs said next instruction pointer to indicate said second target address.

19. The branch prediction apparatus as recited in claim 11, further comprising:

branch history update logic, coupled to said static branch predictor, configured to update branch history entries in said branch history table following resolution of branch instructions, wherein a branch history entry corresponding to said biased outcome branch instruction is not updated.

20. A method for performing branch prediction in a microprocessor, comprising:

identifying a biased outcome branch instruction;

providing a biased static branch prediction for the biased outcome branch instruction, the biased static branch prediction being based upon observed outcome data associated with the biased outcome branch instruction instead of being based upon outcomes corresponding to previous executions of the biased outcome branch instruction;

generating a precedence output to indicate that the biased static branch prediction is to take precedence over a dynamic branch prediction for the biased outcome branch instruction;

directing the microprocessor to fetch instructions in accordance with the biased static branch prediction in lieu of the dynamic branch prediction, wherein the dynamic branch prediction is provided by a corresponding entry in a branch history table;

resolving the outcome of the biased outcome branch instruction; and detecting the precedence output and precluding update of the corresponding entry in the branch history table.

21. The method as recited in claim 20, wherein said providing comprises:

directing that a speculative branch be taken or not taken.

22. The method as recited in claim 21, wherein, if said directing indicates that the speculative branch is to be taken, then said directing instructs the microprocessor to fetch instructions beginning with a branch target instruction corresponding to the biased static branch prediction.

23. The method as recited in claim 22, wherein, said resolving comprises:

executing the biased outcome branch instruction to obtain the outcome of a conditional test.

24. The method as recited in claim 20, wherein said providing renders the biased static branch prediction based upon whether the biased outcome branch instruction is one of a predefined set of branch instructions.

25. The method as recited in claim 24, wherein the predefined set of branch instructions includes one or more of the following test types: overflow, zero, carry, parity, and sign.

* * * * *